United States Patent
Kapeliouchko et al.

(10) Patent No.: US 6,982,308 B2
(45) Date of Patent: Jan. 3, 2006

(54) PTFE-BASED FORMULATION FOR THE INSULATION OF INTEGRATED CIRCUITS

(75) Inventors: Valery Kapeliouchko, Alessandria (IT); Enrico Marchese, Asti (IT); Tatiana Temtchenko, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

(21) Appl. No.: 10/970,009

(22) Filed: Oct. 22, 2004

(65) Prior Publication Data

US 2005/0261454 A1     Nov. 24, 2005

Related U.S. Application Data

(62) Division of application No. 09/931,756, filed on Aug. 20, 2001, now Pat. No. 6,825,304.

(30) Foreign Application Priority Data

Sep. 1, 2000    (IT)   .......................... MI2000A1935

(51) Int. Cl.
*C08F 214/26*      (2006.01)

(52) U.S. Cl. ...................... 526/247; 526/229; 526/250; 526/253; 526/254

(58) Field of Classification Search ................ 526/247, 526/229, 250, 253, 254
See application file for complete search history.

(56) References Cited

U.S. PATENT DOCUMENTS

| | | | |
|---|---|---|---|
| 4,864,006 | A | 9/1989 | Giannetti et al. |
| 4,990,283 | A | 2/1991 | Visca et al. |
| 5,296,165 | A | 3/1994 | Shimizu et al. |
| 5,889,104 | A | 3/1999 | Rosenmayer |
| 5,928,791 | A | 7/1999 | Rosenmayer |
| 6,071,600 | A | 6/2000 | Rosenmayer |
| 6,825,304 | B2 * | 11/2004 | Kapeliouchko et al. ..... 526/247 |

FOREIGN PATENT DOCUMENTS

| | | |
|---|---|---|
| EP | 0 374 804 | 6/1990 |
| EP | 0 890 592 | 1/1999 |
| EP | 0 969 027 | 1/2000 |

* cited by examiner

*Primary Examiner*—Robert D. Harlan
(74) *Attorney, Agent, or Firm*—Arent Fox PLLC

(57) ABSTRACT

A formulation based on the PTFE, homopolymer or modified, comprising:

1) latex of said PTFE having a particle diameter between 5 and 100 nm, comprising an anionic fluorinated surfactant in an amount in the range 2–25% by weight based on the PTFE;

2) a non ionic fluorinated surfactant added to the PTFE latex in an amount in the range 18–60% by weight based on the PTFE.

20 Claims, No Drawings

PTFE-BASED FORMULATION FOR THE INSULATION OF INTEGRATED CIRCUITS

This application is a Divisional of U.S. Ser. No. 09/931,756 filed Aug. 20, 2001, now U.S. Pat. No. 6,825,304.

The present invention relates to a dielectric (per)fluorinated material for the insulation of high frequency integrated circuits, under the form of films having a very good adhesion to the substratum and a thickness lower than 200 nm.

Specifically the invention relates to a dielectric perfluorinated material, for the insulation of high frequency integrated circuits, under the form of a homogeneous film, substantially without defects, obtained from a PTFE nanoemulsion having a particle diameter in the range 5–100 nm; the films of the invention are characterized by a very good adhesion to the substratum, a thickness lower than 200 nm, a dielectric strength higher than 4 Mv/cm, and a weight loss at 425° C. comprised between about 0.0008%/minute and 0.02%/minute.

The modern high frequency integrated circuits contain ten millions of transistors placed on few square centimeters of silicon crystal and they work with frequencies of the order of 1,000 MHz. All the transistors of said integrated circuits must be connected each other by electricity conductors. The modern integrated circuits contain up to six layers of conductor elements. Owing to the sizes and the density of the transistor positioning, it is preferable that both the sizes of the conductor elements and the separation space among the conductors are reduced as much as possible. At present, integrated circuits are produced with conductors having a thickness of 180 nm and separation is lower than 200 nm. In next future the reduction of the conductor thickness is planned up to 100 nm.

The reduction of the conductor sizes and of the separation among conductors causes some problems. The main problem is due to an increase of the resistance-capacity delay (RC-delay), connected to the resistance increase due to a decrease of the conductor section and to the increase of the capacity due to the conductor approach. Besides, the capacity increase implies the decrease of the signal intensity due to the interference among conductors and the heat developed from the integrated circuit increases with consequent increase of the circuit energetic consumption. This makes it necessary a more intense cooling of the circuit.

These problems can be solved by reducing the capacity among the conductor elements by using an insulating material having a lower dielectric constant. At present as insulator among the conductor elements of the integrated circuits, silicon oxide is used, which however shows a high dielectric constant ($\epsilon$=4.2). A lower dielectric constant is that of air ($\epsilon$=1.01), which however does not guarantee the insulation of the conductors, since it shows unacceptable values of dielectric strength, lower than 0.01 MV/cm. The voltage used by modern integrated circuits is of 3.3 V, the distance among the conductors is of the order of 200 nm, wherefore 3.3/200 gives a value of 0.165 MV/cm or 16.5 V/$\mu$m. Therefore, the dielectric strength of the used dielectric material must be higher of at least one order of magnitude than this value. Besides, it is preferable to use an insulating material having a dielectric strength as high as possible, since in the case of porous dielectric material, the dielectric strength remains at acceptable values.

The film thickness of the dielectric material must be very low to guarantee high performances of the integrated circuits. Besides, in modern circuits thicknesses of about 500 nm are used and it is expected that the constant trend to miniaturization requires dielectric materials having a thickness lower than 200 nm.

The integrated circuits during the production process are subjected to various thermal treatments, and therefore, it is important that the dielectric material has a suitable thermal resistance so that it is not damaged during said treatments. In particular, the dielectric material must withstand for a short time temperatures higher than 350° C.

It is known that polytetrafluoroethylene (PTFE) has one among the lowest dielectric constants ($\epsilon$=2,05) of the solid materials and absolutely the lowest one with respect to non porous solid materials which withstand temperatures higher than 350° C. Therefore it is the ideal material for the use as dielectric insulator for high frequency integrated circuits. The problem is to obtain a thin PTFE film without defects having a high dielectric strength.

In U.S. Pat. No. 5,889,104 and U.S. Pat. No. 6,071,600 it is described how to obtain a dielectric material for integrated circuits from PTFE aqueous dispersions by spin coating. In these patents there is described the obtainment of the dielectric material from PTFE dispersions with particles having a diameter lower than 100 nm. Tests carried out by the Applicant (see comparative Examples) show that said PTFE dispersions give films which show defects and unhomogeneity. These films therefore are not able to guarantee good electric properties. Besides in said patents no value of dielectric strength of the obtained films is reported.

In U.S. Pat. No. 5,928,791 a method for improving the dielectric stength of thin PTFE films used in integrated circuits is described. The method includes a quick cooling after the sintering film of PTFE. In the Examples PTFE dispersions with particles having an average diameter of the order of 200 nm are used and films are obtained having a dielectric strength lower than 4 MV/cm, of the order 3.25–3.5 MV/cm, but having a high thickness in the range 500 nm–1,000 nm. Said thickness of the film of the dielectric material results too high and therefore unsatisfactory to guarantee high performances of the integrated circuits.

The need was therefore felt to have available a dielectric material for integrated circuits, under the form of homogeneous film, substantially without defects, having the following combination of properties:

a very good adhesion to the substratum;
a high dielectric strength, higher than 4 MV/cm;
a thickness lower than 200 nm;
a weight loss at 425° C. comprised between about 0.0008%/minute and 0.02%/minute.

An object of the present invention is therefore a formulation based on polytetrafluoroethylene (PTFE), homopolymer or modified, comprising:

1) latex of said PTFE having a particle diameter between 5 and 100 nm, comprising an anionic fluorinated surfactant in an amount in the range 2–25% by weight based on the PTFE, preferably 3–20% by weight;
2) a non ionic fluorinated surfactant added to the PTFE latex in an amount in the range 18–60% by weight based on the PTFE, preferaably 25–45% by weight.

The anionic fluorinated surfactants used during the polymerization for obtaining the PTFE-based dispersion of the invention, are selected from the following compounds:

$$T-O-R_f-CFX-COOM \qquad (IA)$$

wherein: X=F, $CF_3$; M=H, $NH_4$, Na, Li, K;
T is a $C_1$–$C_3$ (per)fluoroalkyl group, optionally containing one Cl atom; preferably it is selected from —$CF_3$, —$C_2F_5$, —$C_3F_7$, —$CF_2Cl$, —$C_2F_4Cl$, —$C_3F_6Cl$; optionally one or two F atoms can be replaced by H;

$R_f$ is a (per)fluoropolyoxyalkylene radical having a number average molecular weight $M_n$ in the range 200–2,000, preferably 350–1,000; $R_f$ is selected in particular from the following classes:

(a) —$(CF_2CF(CF_3)O)_m(CFXO)_n$— wherein m and n are integers such that the n/m ratio is in the range 0.01–0.5 and the molecular weight is in the above range;

(b) —$(CF_2CF_2O)_p(CF_2O)_q$— wherein p and q are integers such that the q/p ratio is in the range 0.5–2 and the molecular weight is in the above range;

(c) —$(CF_2CF(CF_3)O)_r$—$(CF_2CF_2O)_o$—$(CFX''O)_t$— wherein r, s and t are integers such that r+s is in the range 1–50, the t/(r+s) ratio is in the range 0.01–0.05 and the molecular weight is in the above range;

(d) —$(CF(CF_3)CF_2O)_u$— wherein u is an integer such that the molecular weight is in the above range;

(e) —$(CYZ—CF_2CF_2O)_v$— wherein Y and Z, equal to or different from each other, are F, Cl or H; v is a number such that the molecular weight is in the above range;

(f) —$(CF_2CF_2O)_w$— w is a number such that the molecular weight is in the above range.

Among the compounds of formula (IA) as anionic surfactants those of type (a) are preferred:

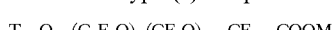

T—O—$(C_3F_6O)_m(CF_2O)_n$—$CF_2$—COOM

Optionally the compounds of formula (IA) can be used in admixture with the following anionic surfactants:

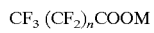

$CF_3(CF_2)_n$COOM          (IIA)

wherein n can range between 4 and 12,

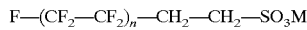

F—$(CF_2$—$CF_2)_n$—$CH_2$—$CH_2$—$SO_3M$          (IIIA)

wherein M=H, $NH_4$, Na, Li, K and n can range between 2 and 5. The amount of optional surfactant (IIA) and/or (IIIA) is lower than 50% by weight with respect to the surfactant (IA). The amount of anionic surfactant used in polymerization is such that the ratio by weight between the surfactant and the TFE converted into polymer is lower than 1, preferably in the range 0.02–0.25. The surfactant can also be fed partly at the starting of the polymerization and partly during the polymerization reaction.

The non ionic fluorinated surfactants which are added to the PTFE latex obtained from the polymerization have the following structure:

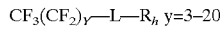

$CF_3(CF_2)_Y$—L—$R_h$ y=3–20          (IB)

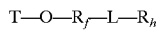

T—O—$R_f$—L—$R_h$          (IIB)

wherein:

$R_f$ is selected from the above structures (a), (b), (c), (d), (e), (f);

L is a divalent organic group, a linking group between $R_f$ and $R_h$, selected from: —CO—$NR^1$—, —$CH_2(OCH_2CH-R^2)_a$—O—, —$CH_2$ $(OCH_2CHR^2)_b$—O—CO—, —$CH_2O$—$(CH_2)_c$—CO—O—, —$CH_2$—$CH_2$—O—, —$CH_2$—$CH_2$—; wherein $R^1$ is —H or a $C_1$–$C_4$ alkyl; $R^2$ is —H or a $C_1$–$C_2$ alkyl; a, b are numbers from 0 to 6, preferably from 0 to 2; c is a number from 1 to 3;

$R_h$ is a radical having a polyoxyalkylene structure selected from:

(i) —$(CH_2CH_2O)_qCH_2CH_2Z$, wherein: q is an integer from 5 to 70, preferably from 6 to 25; Z is selected from —OH, $C_1$–$C_4$ alkoxy;

(ii) —$(CH_2CH_2O)_r(CH_2CH(CH_3)O)_nCH_2CHR^3Z$, wherein r+s is an integer from 5 to 70, preferably from 10 to 50; the r/s ratio is in the range 0.1–10, preferably 0.5–5; $R^3$ is selected between —H and —$CH_3$; Z is selected between —OH, $C_1$–$C_4$ alkoxy;

Preferably as non ionic surfactants the following compounds are used:

the compounds of structure (IB) with y=5, L=—$CH_2$—$CH_2$—O—, and $R_h$=—$(CH_2CH_2O)_q$ $CH_2CH_2OH$ wherein q=6, said compounds are commercialized with the name FORAFAC 1110D®;

the compounds of structure (IIB) having $R_f$ of structure (a) with T=—$C_3F_6Cl$, m and n such to give a molecular weight in the range 450–650; L=—CONH—; $R_h$=—$(CH_2CH_2O)_qCH_2CH_2OCH_3$ wherein q=21, said compounds are commercialized with the name Fluorolink C455®.

The latex of PTFE homopolymer or modified, having a particle diameter in the range 5–100 nm is obtained by the radical polymerization process of tetrafluoroethylene in the presence of a microemulsion containing the above anionic surfactants (IA), said process being described in EP 969,027 in the name of the Applicant, herein incorporated by reference. The microemulsions used for the polymerization are described in U.S. Pat. No. 4,864,006 and U.S. Pat. No. 4,990,283.

PTFE nanoemulsions having an average diameter of the latex particles in the range 5–100 nm, preferably 10–50 nm, of the following classes, are the preferred ones for the present invention:

nanoemulsions of PTFE homopolymer: the use of the PTFE homopolymer nanoemulsions allows to obtain a dielectric material having a greater thermal stability with respact to the modified PTFE;

nanoemulsions of modified PTFE, i.e. TFE copolymers with one or more comonomers containing at least one unsaturation of ethylene type in an amount up to 6% by moles, preferably up to 1% by moles. Generally, the use of nanoemulsions of modified PTFE allows to obtain a dieletric material having improved electric properties with respect to the PTFE homopolymer.

The comonomers which can be used for preparing the modified PTFE, are both of hydrogenated and fluorinated type; among the hydrogenated comonomers we can mention:

ethylene, propylene, acrylic monomers, for example methylmethacrylate, (meth)acrylic acid, butylacrylate, hydroxyethylhexylacrylate, styrene monomers, such as for example styrene. Among the fluorinated comonomers, we can mention:

$C_3$–$C_8$ perfluoroolefins, such as hexafluoropropene (HFP);

$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2$=CH—$R_f$, wherein $R_f$ is a $C_1$–$C_6$ perfluoroalkyl;

$C_2$–$C_8$ chloro- and/or bromo- and/or iodo-fluoroolefins, such as chlorotrifluoroethylene (CTFE);

$CF_2$=$CFOR_f$ (per)fluoroalkylvinylethers (PAVE), wherein $R_f$ is a $C_1$–$C_6$ (per)fluoroalkyl, for example $CF_3$, $C_2F5$, $C_3F_7$;

$CF_2=CFOX$ (per)fluoro-oxyalkylvinylethers, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl; fluorodioxoles, preferably perfluorodioxoles.

Fluorinated comonomers are preferred, preferably those which do not ccompromise the PTFE thermal stability, in particular perfluoromethoxydioxole (MDO), perfluoropropylvinylether (PPVE), perfluoromethylvinylether (PMVE) and perfluoropropene (PFP).

The formulations of the present invention are used under the form of dielectric film for the insulation of integrated circuits. The thickness of the obtained films is lower than 200 nm, their dielectric stength higher than 4 MV/cm.

The dielectric films of the invention for the insulation of integrated circuits are obtained by the deposition of the formulation on a substratum (integrated circuit), preferably using the spin coating technique, subsequent sintering at a temperature higher than the PTFE melting T, subsequent air-cooling.

In a preferred embodiment of the invention, the deposition is carried out by spin coating, preferably using a constant spinning rate in the range 3,000–10,000 rpm for a time generally comprised between 30 seconds and 5 minutes to assure the uniformity of the thickness and the homogeneity of the deposited film. Then, the obtained film is sintered at a temperature higher than 320° C., preferably in the range 390° C.–410° C.; subsequently the sintered film is air-cooled. A film of dielectric material having a good adhesion to the substratum is obtained, with a dielectric constant lower than 2.2, a thickness lower than 200 nm, the dielectric strength being higher than 4 MV/cm and the weight loss at 425° C. in the range 0.0008–0.02%/min.

The total amount of non ionic and anionic surfactants used in the present invention must be such to guarantee a good wettability of the silicon wafer. An excessive amount of surfactants produces surface defects in the obtained films. By using an amount of fluorinated anionic surfactant higher than 25% by weight with respect to PTFE, a dispersion able to wet the wafer surface can be obtained, but the obtained films are unhomogeneous and one cannot obtain a continuous film having a thickness lower than 200 nm. It is presumed that this effect can be due to the fact that by increasing the amount of the anionic surfactant, the thickness of the double electric layer around the dispersion particles increases. This implies a significant increase of the dispersion viscosity and it does not allow the particles to get near each other to form a compact and homogeneous film.

The formulation of the present invention can optionally be added with water, organic solvents, such for example ethyl or isopropyl alcohol; adhesion promoters, etc., foaming agents and other additives, such for example silicon oxide to improve the mechanical properties.

As said, the formulation of the present invention allows to obtain insulating films having a dielectric constant lower than 2.2, a thickness lower than 200 nm, preferably in the range 50 nm–150 nm, and a dielectric strength higher than 4 MV/cm and having a weight loss at 425° C. in the range 0.0008–0.02%/min. Such combination of properties is very good for the use as dielectric material for the insulation of conductors in integrated circuits.

The following Examples are mentioned for illustrative purposes, but not limitative of the scope of the invention.

EXAMPLES

Characterization:

The determination of the first melting temperature is carried out by the differential calorimetry technique, using a calorimeter Perkin Elmer DSC 7 type. About 10 mg of dried polymer are heated from the temperature of 220° C. up to 370° C. at a 10° C./min rate. The temperature corresponding to the maximum of the melting endothermic curve is indicated as first melting temperature of the polymer.

The thermal stability is determined by thermogravimetric analysis by using an instrument Perkin Elmer, series 7. About 10 mg of dried polymer are heated from room temperature up to 425° C. at the rate of 20° C./min. When 425° C. are reached, the temperature is automatically stabilized by the instrument and the specimen is maintained at that temperature for 2 hours. The weight loss percent is then recorded and used as an index of the polymer thermal stability.

The average particle diameter is measured by an instrument based on the laser light diffusion, in particular on the Photon Correlation Spectroscopy, equipped with the correlator Brookhaven, model 2030 AT and Argon laser light source, by Spectra-Physics, having a wave length 514.5 nm. The latex samples to be measured, are suitably diluted with water filtered by 0.2 $\mu$m Millipore filter. The scattering measurement is carried out at room temperature at a 90° angle. The latex particle diameter is obtained by the accumulator method.

The polymer content in the latex discharged from the reactor is estimated by the weight loss at 150° C. for 1 hour. In particular about 20 grams of latex are weighed in a glass beaker and put in a stove to dry for 1 hour at 150° C. The latex dry content is obtained by the formula:

Dry product %=100×weight after drying/latex initial weight.

The deposition of the PTFE film on a silicon wafer having 40×40 mm sizes, is carried out by a spin coater model SCS α-6708/6712 by Specialty Coating Systems, Inc. (maximum chuck rotation rate=8,000 RPM, maximum acceleration/deceleration time=30 seconds, maximum spinning time=999 seconds).

The wetting power of the formulation applied on silicon wafer is visually evaluated by observing the behaviour of one drop of the formulation positioned on the support. If the drop maintains its spherical shape, the wetting power is considered insufficient ("no" in Table 2), while the evaluation "yes" in Table 2 corresponds to the complete spreading of the drop immediately after its positioning on the wafer.

The thickness of the deposited film is determined by an atomic force microscope (AFM).

The quality of the obtained film is evaluated by using the following evaluation scale in Table 2:

very good: homogeneous film without surface defects;

good: homogenous film having a number of surface defects lower than 5 on the silicon wafer specimen;

fairly good: film without cracks with a number of surface defects lower than 10 on the silicon wafer specimen;

poor: cracked, unhomogeneous film, having a high number of defects on the silicon wafer specimen.

To determine the electric properties of the PTFE films MOS condensers are made having circular contacts with a diameter ranging from 50 to 400 μm on the surface of the deposited and sintered films. To obtain the MOS condensers an aluminum film is deposited by evaporation by electron gun with a basis vacuum<$10^{-7}$ mbar. The manufacture of circular contacts is made by lift-off processes (removal of the metal from the zones of no interest) or by chemical removal of the parts of no interest. The preferred method is the chemical removal, which does not generate the possible defects in the PTFE film. For the chemical removal a solution of HF, $H_2O_2$ and deionized water in 1:2:50 ratio by weight has been used.

The capacity has been determined by a C-V analyzer Keithley 590. The capacity of a MOS condenser with the semi-conductor electrode constituted by very doped (degenerate) silicon can be approximated to the capacity of a flat condenser (the contribution given to the capacity by the emptied zone of the semiconductor to the interface being considered insignificant):

$$C = \epsilon_r * \epsilon_0 * A/d \quad (2)$$

wherein:
A=area of the condenser;
d=thickness of the PTFE film measured by atomic force microscope;
$\epsilon_0$=dielectric constant of vacuum
$\epsilon_r$=dielectric constant of the PTFE film.

The dielectric constant of the PTFE film is calculated according to formula (2) by the measures of the capacity and area of the condenser, and of the film thickness. Considering various areas of the condenser, uniform values of the dielectric constant of the PTFE film have been found.

The dielectric strength is measured on the MOS condensers obtained from PTFE films. The silicon wafer is electrically bonded by silver paste, while the aluminum contacts are connected to a variable voltage source connected in series to a picoamperometer (HP4140B).

The film adhesion on the wafer surface is evaluated by using the cross cut method (ASTM D3359-87) which considers the cut on the film surface of 100 small squares having a 1 mm side, using a cutting blade and subsequent removal of the small squares by applying the adhesive tape. At the end of the test, the amount of the removed small squares is evaluated: it corresponds to the percentage of adhesion.

Example 1

In a glass reactor:
5 parts of an anionic perfluorinated surfactant having structure (IA):

$$\text{ClC}_3F_6O(C_3F_6O)_nCF_2COONH_4 \quad (IA)$$

wherein n is such that the acidic molecular weight is equal to 530;
3 parts of a perfluoropolyether having the structure:

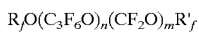

$$R_fO(C_3F_6O)_n(CF_2O)_mR'_f$$

wherein n and m are integers such to give a number average molecular weight of about 700; $R_f$, $R'_f$ equal to or different from each other are perfluoroalkyls from 1 to 3 carbon atoms;
8 parts of water.
are introduced.

The resulting microemulsion results to be perfectly limpid.

3810 grams of the obtained microemulsion are added to 29 liters of carefully degassed water in a 50 liters autoclave equipped with a mechanical stirrer and previously put under vacuum. Also 140 grams of paraffin with softening point in the range 52° C.–54° C. were previously introduced into the reactor. 900 mbar of ethane are fed to the autoclave. The autoclave is kept under mechanical stirring and is pressurized with tetrafluoroetilene (TFE) up to a pressure of 20 bar at a temperature of 88° C. At this point 500 cc of a $(NH_4)_2S_2O_8$ (APS) solution corresponding to 5,000 mg of APS are fed to the autoclave as polymerization initiator.

When the pressure in the reactor has decreased of 0.5 bar, one starts to feed TFE by a compressor so as to maintain a constant pressure of 20 bar inside the reactor. In the meantime the internal temperature of the reactor is increased up to 100° C. at a rate equal to 0.7° C./min. After 32 minutes, the TFE feeding is stopped, the reactor evacuated and cooled.

The diameter of the polymer primary particles measured by Laser Light Scattering (LLS) is equal to 17 nm. The discharged latex has a concentration of 312 g PTFE/kg dispersion. The PTFE latex contains a concentration by weight of anionic perfluorinated surfactant equal to 8.65% based on the PTFE.

By the DSC analysis it results that the obtained polyymer shows a first melting temperature of 323.6° C., and by the TGA analysis a weight loss at 425° C. in 2 hours of 0.75% by weight is determined, which corresponds to an index of good thermal stability.

Example 2

3,810 grams of the microemulsion obtained in Example 1 are added to 29 liters of carefully degassed water into a 50 liters autoclave equipped with a mechanical stirrer and previously put under vacuum. Also 140 grams of paraffin with softening point in the range 52° C.–54° C. were previously introduced into the reactor. 900 mbar of ethane and 150 grams of perfluoromethoxydioxole (MDO) are fed to the autoclave. The autoclave is kept under mechanical stirring and is pressurized with tetrafluoroetilene (TFE) up to a pressure of 20 bar at a temperature of 88° C. At this point 500 cc of a $(NH_4)_2S_2O_8$ (APS) solution corresponding to 5,000 mg of APS are fed to the autoclave as polymerization initiator.

When the pressure in the reactor has decreased of 0.5 bar, one starts to feed TFE by a compressor so as to maintain a constant pressure of 20 bar inside the reactor. In the meantime the internal temperature of the reactor is increased up to 100° C. at a rate equal to 0.7° C./min. After 40 minutes, the TFE feeding is stopped, the reactor evacuated and cooled.

The diameter of the polymer primary particles measured by Laser Light Scattering (LLS) is equal to 23 nm. The discharged latex has a concentration of 315 g PTFE/kg dispersion. The PTFE latex contains a concentration by weight of anionic perfluorinated surfactant equal to 8.57% based on the PTFE.

By the DSC analysis it results that the obtained polymer shows a first melting temperature of 321.6° C., and by the TGA analysis a weight loss at 425° C. in 2 hours of 0.98% by weight is determined, which corresponds to an index of good thermal stability.

Example 3

2,500 grams of the microemulsion obtained in Example 1 are added to 29 liters of carefully degassed water in a 50 liters autoclave equipped with a mechanical stirrer and previously put under vacuum. Also 140 grams of paraffin with softening point in the range 52° C.–54° C. were previously introduced into the reactor. 600 mbar of ethane and 150 grams of perfluoromethoxydioxole (MDO) are fed to the autoclave. The autoclave is kept under mechanical stirring and is pressurized with tetrafluoroetilene (TFE) up to a pressure of 20 bar at a temperature of 85° C. At this point 500 cc of a $(NH_4)_2S_2O_8$ (APS) solution corresponding to 5,000 mg of APS are fed to the autoclave as polymerization initiator.

When the pressure in the reactor has decreased of 0.5 bar, one starts to feed TFE by a compressor so as to maintain a constant pressure of 20 bar inside the reactor. In the meantime the internal temperature of the reactor is increased up to 95° C. at a rate equal to 0.5° C./min. After 25 minutes, the TFE feeding is stopped, the reactor evacuated and cooled.

The diameter of the polymer primary particles measured by Laser Light Scattering (LLS) is equal to 23 nm. The discharged latex has a concentration of 156 g PTFE/kg dispersion. The PTFE latex contains a concentration by weight of anionic perfluorinated surfactant equal to 17.31% based on the PTFE.

By the DSC analysis it results that the obtained polymer shows a first melting temperature of 319.8° C.

Example 4

2,130 grams of the microemulsion of Example 1 are added to 30 liters of carefully degassed water in a 50 liters autoclave equipped with a mechanical stirrer and previously put under vacuum. Also 140 grams of paraffin with softening point in the range 52° C.–54° C. were previously introduced into the reactor. The autoclave is kept under mechanical stirring and is pressurized with TFE up to a pressure of 20 bar at a temperature of 80° C. 500 cc of a $(NH_4)_2S_2O_8$ (APS) solution corresponding to 2,500 mg of APS are fed to the autoclave.

When the pressure in the reactor has decreased of 0.5 bar, one starts to feed TFE by a compressor so as to maintain a constant pressure of 20 bar inside the reactor. In the meantime the internal temperature of the reactor is increased up to 100° C. at a rate equal to 1.0° C./min. After 25 minutes, the TFE feeding is stopped, the reactor evacuated and cooled. An aqueous dispersion containing 375 g PTFE/kg dispersion is obtained. The PTFE latex contains a concentration by weight of anionic perfluorinated surfactant equal to 3.65% based on the PTFE.

The diameter of the polymer primary particles measured by Laser Light Scattering (LLS) is equal to 77 nm.

The DSC analysis shows a first melting temperature of 331.1° C. The polymer shows at 425° C. in a 2 hours' interval a weight loss equal to 0.115%, index of a very good thermal stability.

Example 5

In a glass reactor:

5 parts of an ammonium salt of an acid (anionic perfluorinated surfactant) having structure (IA)

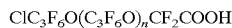

wherein n is such that the acidic molecular weight is equal to 530;

3 parts of a perfluoropolyether having the structure:

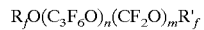

wherein n and m are integers such to give a number average molecular weight of about 440; $R_f$, $R'_f$, equal to or different from each other are perfluoroalkyls from 1 to 3 carbon atoms;

8 parts of water;

are introduced.

The resulting microemulsion results to be perfectly limpid.

30 liters of carefully degassed water are introduced into the 50 liters reactor. Also 140 grams of paraffin with softening point in the range 52° C.–54° C. were previously introduced into the reactor. The reactor is put under vacuum for 10 minutes and subsequently pressurized at 20 bar and heated up to 80° C. At this point 2,130 grams of the previous microemulsion are fed to the reactor. Subsequently 500 cc of a $(NH_4)_2S_2O_8$ (APS) solution corresponding to 1,500 mg of APS are fed to the autoclave.

When the pressure in the reactor has decreased of 0.5 bar, one starts to feed TFE by a compressor so as to maintain a constant pressure of 20 bar inside the reactor. In the meantime the internal temperature of the reactor is increased up to 100° C. at a rate equal to 1.0° C./min. After 15 minutes, the TFE feeding is stopped, the reeactor evacuated and cooled. An aqueous dispersion containing 245 g PTFE/kg dispersion is obtained. The PTFE latex contains a concentration by weight of anionic perfluorinated surfactant equal to 6.53% based on the PTFE.

The diameter of the polymer primary particles measured by Laser Light Scattering (LLS) is equal to 71 nm.

The polymer shows at 425° C. in a 2 hours' interval a weight loss equal to 0.096%, an index of a very good thermal stability. The DSC analysis shows a first melting temperature of 331.2° C.

Example 6

2,000 grams of the microemulsion obtained in Example 1 are added to 31 liters of carefully degassed water in a 50 liters autoclave equipped with a mechanical stirrer and previously put under vacuum. 400 mbar of ethane are fed to the autoclave. The autoclave is kept under mechanical stirring and is pressurized with tetrafluoroethylene (TFE) up to a pressure of 20 bar at a temperature of 85° C. At this point 500 cc of a $(NH_4)_2S_2O_8$ (APS) solution corresponding to 5,000 mg of APS are fed to the autoclave as polymerization initiator.

When the reactor pressure has decreased of 0.5 bar, one starts to feed TFE by a compressor so as to maintain a constant pressure of 20 bar inside the reactor. In the meantime the internal temperature of the reactor is increased up to 95° C. at a rate equal to 0.33° C./min. After the reaction of 10 kg of TFE has taken place, 250 grams of di-iodo-perfluorobutane $C_4F_8I_2$ are fed to the autoclave. When 11 kg of TFE have reacted, the TFE feeding is stopped, the reactor evacuated and cooled.

The diameter of the polymer primary particles measured by Laser Light Scattering (LLS) is equal to 52 nm. The discharged latex has a concentration of 295 g PTFE/kg dispersion. The PTFE latex contains a concentration by weight of anionic perfluorinated surfactant equal to 6.1% based on the PTFE.

Example 7 (Comparative)

11 grams of the aqueous solution ammonium perfluorooctanoate and 31 liters of carefully degassed demineralized water are fed to a 50 liters autoclave equipped with a mechanical stirrer and previously put under vacuum. Also 140 grams of paraffin with softening point in the range 52°–54° C. were previously introduced into the reactor. The autoclave is kept under mechanical stirring and is pressurized with TFE up to a pressure of 20 bar at a temperature of 62° C. Then 500 cc of a solution of $(NH_4)_2S_2O_8$ (APS) and disuccinic peroxide (DSAP) corresponding to 150 mg of APS and 3,000 mg of DSAP are introduced.

When the pressure in the reactor has decreased of 0.5 bar, one starts to feed TFE by a compressor so as to maintain a constant pressure of 20 bar inside the reactor. In the meantime the internal temperature of the reactor is increased up to 80° C. at a rate equal to 0.5° C./min. During the reaction 50.5 grams of the aqueous solution at 100 grams/liter of ammonium perfluorooctanoate (PFOA) are fed to the autoclave. After 90 minutes, the TFE feeding is stopped when 15,800 grams of TFE have reacted, the reactor vented and cooled. The discharged latex has a concentration of 510 g PTFE/liter water.

The diameter of the polymer primary particles measured by Laser Light Scattering (LLS) is equal to 230 nm. The obtained PTFE latex is concentrated up to a PTFE concentration equal to 60% by weight. The PTFE latex contains a concentration by weight of anionic perfluorinated surfactant PFOA equal to 0.08% based on the PTFE.

The polymer shows at 425° C. in a 2 hours' interval a weight loss equal to 0.05%. The DSC analysis shows a first melting temperture of 343° C.

Example 8

A silicon wafer having 40×40 mm sizes was completely covered with a formulation of the invention having the following composition:

- 100 g of the PTFE latex obtained in Example 1;
- 56 g of demineralized water;
- 30% by weight based on the PTFE of a fluorinated non ionic surfactant of structure (IB):

$$CF_3(CF_2)_5-(CH_2CH_2O)_8H \quad (IB)$$

said surfactant is present in a solution at 40% in water/isopropanol, commercialized as Forafac® 1110D.

The silicon wafer was then subjected to the spin coating technique at a rate of 5,000 RPM for a duration equal to 60 seconds. The PTFE film formed after said procedure was first dried and then sintered at a temperature of 400° C. for 2 min. and then air-cooled. Then the quality of the film obtained after drying and sintering, the PTFE film adhesion to the wafer surface, the thickness and the dielectric properties were evaluated. The results are reported in Table 2.

Example 9

A silicon wafer having the above sizes was completely covered with an invention formulation having the following composition:

- 100 g of the PTFE latex obtained in Example 1;
- 56 g of demineralized water;
- 45% by weight based on the PTFE of the fluorinated non ionic surfactant of Example 8.

The silicon wafer was then subjected to the spin coating technique at a rate of 5,000 RPM for a duration equal to 60 seconds. The PTFE film formed after such procedure was first dried and then sintered at a temperature of 400° C. for 2 min. and then air-cooled. Then the quality of the film obtained after drying and sintering, the PTFE film adhesion to the wafer surface, the thickness and the dielectric properties were evaluated. The results are reported in Table 2.

Example 10

A silicon wafer having the above sizes was completely covered with an invention formulation having the following composition:

- 100 g of the PTFE latex obtained in Example 1;
- 56 g of demineralized water;
- 30% by weight based on the PTFE of a fluorinated non ionic surfactant of structure (IIB):

$$C_3F_6Cl-O-(CF_2CF(CF_3)O)_m(CF_2O)_n-CF_2-$$
$$CONH-(CH_2CH_2O)_{21}CH_2CH_2OCH_3$$

m and n such to give a molecular weight in the range 450–650; commercialized with the name Fluorolink C455®.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled. Then the quality of the film obtained after drying and sintering, the PTFE film adhesion to the wafer surface, the thickness and the dielectric properties were evaluated. The results are reported in Table 2.

Example 11

A silicon wafer having the above sizes was completely covered with an invention formulation having the following composition:

- 100 g of the PTFE latex obtained in Example 2;
- 57.5 g of demineralized water;
- 30% by weight based on the PTFE of the fluorinated non ionic surfactant of Example 10.

The silicon wafer was then subjected to the spin coating tecnique at a rate of 5,000 RPM for a duration equal to 60 seconds. The PTFE film formed after such procedure was first dried and then sintered at a temperature of 400° C. for 2 min and then air-cooled.

The results are reported in Table 2.

Example 12

A silicon wafer having the above sizes was completely covered with an invention formulation having the following composition:

- 100 g of the PTFE latex obtained in Example 2;
- 57.5 g of demineralized water;
- 30% by weight based on the PTFE of the fluorinated non ionic surfactant of Example 8.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2.

Example 13

A silicon wafer having the above sizes was completely covered with an invention formulation having the following composition:
- 100 g of the PTFE latex obtained in Example 3;
- 25% by weight based on the PTFE of the fluorinated non ionic surfactant of Example 8.

The silicon wafer was then subjected to the spin coating technique at a rate of 3,000 RPM for a duration equal to 60 seconds. The PTFE film formed after such procedure was first dried and then sintered at a temperature of 400° C. for 2 min and then air-cooled.

A dielectric constant of the PTFE film equal to 2.0 was measured. The results are reported in Table 2.

Example 14

A silicon wafer having the above sizes was completely covered with an invention formulation having the following composition:
- 100 g of the PTFE latex obtained in Example 3;
- 25% by weight based on the PTFE of the fluorinated non ionic surfactant of Example 8.

The silicon wafer was then subjected to the spin coating technique at a rate of 8,000 RPM for a duration equal to 60 seconds. The PTFE film formed after such procedure was first dried and then sintered at a temperature of 400° C. for 1 min and then air-cooled.

The results are reported in Table 2.

Example 15

A silicon wafer having the above sizes was completely covered with an invention formulation having the following composition:
- 100 g of the PTFE latex obtained in Example 6;
- 25 g of demineralized water;
- 30% by weight based on the PTFE of the fluorinated non ionic surfactant of Example 8.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2.

Example 16 (Comparative)

A silicon wafer having the above sizes was completely covered with an invention formulation having the following composition:
- 100 g of the PTFE latex obtained in Example 7 having an average particle size equal to 230 nm;
- 100 g of demineralized water;
- 6% by weight based on the PTFE of a hydrogenated non ionic surfactant of structure (C):

$$C_8H_{17}-C_6H_4-O-(CH_2CH_2O)_{9.5}H \quad (C)$$

commercialized as TRITON® X100.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2 and they show that the obtained PTFE film has a thickness higher than 200 nm and it does not adhere to the silicon wafer.

Example 17 (Comparative)

A silicon wafer having the above sizes was completely covered with an invention formulation having the following composition:
- 100 g of the PTFE latex obtained in Example 1;
- 25% by weight based on the PTFE of an ionic surfactant ammonium perfluorooctanoate (PFOA).

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2 and they show that the obtained PTFE film is of poor quality due to surface defects and unhomogeneity. Therefore the film is not suitable to be used for the insulation of conductors in integrated circuits.

Example 18 (Comparative)

A silicon wafer having the above sizes was completely covered with an invention formulation having the following composition:
- 100 g of the PTFE latex obtained in Example 1;
- 62.5% by weight based on the PTFE of an ionic surfactant ammonium perfluorooctanoate (PFOA).

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2 and they show that the obtained PTFE film is of poor quality due to surface defects and unhomogeneity. Threfore the film is not suitable to be used for the insulation of conductors in integrated circuits.

Example 19 (Comparative)

A silicon wafer having the above sizes was completely covered with an invention formulation having the following composition:
- 100 g of the PTFE latex obtained in Example 1;
- 56 g of demineralized water;
- 10% by weight based on the PTFE of the fluorinated non ionic surfactant of Example 8.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2 and they show that no PTFE film is obtained since the formulation has no wetting power with respect to the silicon wafer.

Example 20 (Comparative)

A silicon wafer having the above sizes was completely covered with an invention formulation having the following composition:
- 100 g of the PTFE latex obtained in Example 1;
- 56 g of demineralized water;
- 10% by weight based on the PTFE of the fluorinated non ionic surfactant of Example 16.

The silicon wafer was then subjected to the spin coating technique at a rate of 5,000 RPM for a duration equal to 60 seconds. The PTFE film formed after such procedure was first dried and then sintered at a temperature of 400° C. for 2 min and then air-cooled.

The results are reported in Table 2 and they show that no PTFE film is obtained since the formulation has no wetting power with respect to the silicon wafer.

TABLE 1

| EXAMPLE | PARTICLE DIAMETER (nm) | POLYMERIZATION SURFACTANT Type | POLYMERIZATION SURFACTANT % by wt. on PTFE | COMONOMER Type | COMONOMER Contents % by wt. | TGA 425° C./2h (% by weight) |
|---|---|---|---|---|---|---|
| 1 | 17 | (IA) | 8.65 | — | — | 0.75 |
| 2 | 23 | (IA) | 8.57 | MDO | 1.0 | 0.98 |
| 3 | 23 | (IA) | 17.31 | MDO | 1.0 | — |
| 4 | 77 | (IA) | 3.65 | — | — | 0.115 |
| 5 | 71 | (IA) | 6.53 | — | — | 0.096 |
| 6 | 52 | (IA) | 6.10 | — | — | — |
| 7 (comp.) | 230 | PFOA | 0.08 | — | — | 0.05 |

TABLE 2

| Example | Used PTFE latex | Surfactant of formulation Type | Surfactant of formulation % by wt. on PTFE | Wetting power Formulation | Film Quality dried | Film Quality sintered | Film thickness (nm) | Dielectric rigidity (MV/cm) | Adhesion % |
|---|---|---|---|---|---|---|---|---|---|
| 8 | Ex. 1 | (IB) | 30 | YES | good | very good | 150 | 5.0 | 100 |
| 9 | Ex. 1 | (IB) | 45 | YES | good | very good | 150 | | 100 |
| 10 | Ex. 1 | (IIB) | 30 | YES | fair | good | 115 | | 100 |
| 11 | Ex. 2 | (IIB) | 30 | YES | fair | good | — | | 100 |
| 12 | Ex. 2 | (IB) | 30 | YES | good | very good | 120 | | 100 |
| 13 | Ex. 3 | (IB) | 25 | YES | good | good | 130 | 5.0 | 100 |
| 14 | Ex. 3 | (IB) | 25 | YES | good | good | 90 | | 100 |
| 15 | Ex. 6 | (IB) | 30 | YES | good | very good | 160 | | 100 |
| 16 comp. | Ex. 7 | (C) | 6 | YES | fair | fair | 350 | | 0 |
| 17 comp. | Ex. 1 | PFOA | 25 | YES | poor | poor | — | <0.2 | — |
| 18 comp. | Ex. 1 | PFOA | 62.5 | YES | poor | poor | — | <0.2 | — |
| 19 comp. | Ex. 1 | (IB) | 10 | NO | (*) | (*) | — | — | — |
| 20 comp. | Ex. 1 | (C) | 10 | NO | (*) | (*) | — | — | — |

(*) no film is obtained.

What is claimed is:

1. A formulation based on the PTFE, homopolymer or modified, comprising:
   1) latex of said PTFE having a particle diameter between 5 and 100 nm, comprising an anionic fluorinated surfactant in an amount in the range of 2% to 25% by weight based on the PTFE;
   2) a non ionic fluorinated surfactant, added to the PTFE latex in an amount in the range of 18% to 60% by weight based on the PTFE.

2. A formulation according to claim 1, wherein the anionic fluorinated surfactant is in an amount in the range of 3% to 20% by weight based on the PTFE.

3. A formulation according to claim 1, wherein the non ionic fluorinated surfactant is in an amount in the range of 25% to 45% by weight based on the PTFE.

4. A formulation according to claim 1, wherein the anionic fluorinated surfactants are selected from:

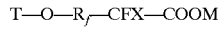  (IA)

wherein:
  X=F, $CF_3$;
  M=H, $NH_4$, Na, Li, K;
  T is a $C_1$–$C_3$ (per)fluoroalkyl group, optionally containing one Cl atom and optionally one or two F atoms can be replaced by H;
  $R_f$ is a (per)fluoropolyoxyalkylene radical having a number average molecular weight Mn in the range of 200 to 2,000, and is selected from:
  (a) —$(CF_2CF(CF_3)O)_m(CFXO)_n$—
    wherein m and n are integers such that the n/m ratio is in the range 0.01 to 0.5 and the molecular weight is in the above range;
  (b) —$(CF_2CF_2O)_p(CF_2O)_q$—
    wherein p and q are integers such that the q/p ratio is in the range 0.5 to 2 and the molecular weight is in the above range;
  (c) —$(CF_2CF(CF_3)O)_r$—$(CF_2CF_2O)_s$—$(CFX^{II}O)_t$—
    wherein r, s and t are integers such that r+s is in the range 1 to 50, the t/(r+s) ratio is in the range 0.01 to 0.05 and the molecular weight is in the above range;
  (d) —$(CF(CF_3)CF_2O)_u$—
    wherein u is an integer such that the molecular weight in the above range;
  (e) —$(CYZ$—$CF_2CF_2O)_v$—
    wherein Y and Z, equal to or different from each other, are F, Cl or H; v is a number such that the molecular weight is in the above range; or
  (f) —$(CF_2CF_2O)_w$—
    w is a number such that the molecular weight is in the above range.

5. A formulation according to claim 4, wherein the anionic fluorinated surfactants (IA) are the compounds having $R_f$ of type (a):

$$T-O-(C_3F_6O)_m(CF2O)_n-CF_2-COOM.$$

6. A formulation according to claim 4, wherein T is selected from the group consisting of $-CF_3$, $-C_2F_5$, $-C_3F_7$, $-CF_2Cl$, $-C_2F_4Cl$, and $-C_4F_6Cl$.

7. A formulation according to claim 4, wherein the number average molecular weight Mn is in the range of 350 to 1,000.

8. A formulation according to claim 1, wherein the compounds of formula (IA) are used in admixture with the following anionic surfactants:

$$CF_3(CF_2)_nCOOM \quad (IIA)$$

wherein n can range between 4 and 12, and $$F-(CF_2-CF_2)_n-CH_2-CH_2-SO_3M \quad (IIIA)$$

wherein $M=H$, $NH_4$, Na, Li, K and n can range between 2 and 5.

9. A formulation according to claim 1, wherein the non ionic fluorinated surfactants added to the PTFE polymerization latex have the following structures:

$$CF_3(CF_2)_y-L-R_h \quad (IB)$$

wherein y=3 to 20

$$T-O-R_f-L-R_h \quad (IIB)$$

and wherein:
$R_f$ is selected from the structures (a), (b), (c), (d), (e), (f) of claim 4;
L is a divalent organic group, a linking group between $R_f$ and $R_h$, selected from:
—CO—NR$^1$—,
—CH$_2$ (OCH$_2$CHR$^2$)$_a$—O—,
—CH$_2$ (OCH$_2$CHR$^2$)$_b$—O—CO—,
—CH$_2$O—(CH$_2$)—CO—O—,
—CH$_2$—CH$_2$—O—,
—CH$_2$—CH$_2$—;
wherein:
R$^1$ is —H or a C$_1$ to C$_4$ alkyl;
R$^2$ is —H or a C$_1$ to C$_2$ alkyl;
a, b are numbers from 0 to 6;
C is a number from 1 to 3;
$R_h$ is a radical having a polyoxyalkylene structure selected from:
(i) —(CH$_2$CH$_2$O)$_q$CH$_2$CH$_2$Z,
wherein:
q is an integer from 5 to 70;
Z is selected from —OH, C$_1$ to C$_4$ alkoxy;
(ii) —(CH$_2$CH$_2$O)$_r$(CH$_2$CH(CH$_3$)O)$_s$CH$_2$CHR$^3$Z,
wherein:
r+s is an integer from 5 to 70;
the r/s ratio is in the range of 0.1 to 10;
R$^3$ is selected between —H and —CH$_3$;
Z is selected between —OH and C$_1$ to C$_4$ alkoxy.

10. A formulation according to claim 9, wherein a and b are numbers from 0 to 2.

11. A formulation according to claim 9, wherein q is an integer from 6 to 25.

12. A formulation according to claim 9, wherein r+s is an integer from 10 to 50.

13. A formulation according to claim 9, wherein the r/s ratio is in the range of 0.5 to 5.

14. A formulation according to claim 9, wherein the non ionic surfactants are:
the compounds of structure (IIB) with
y=5,
L=—CH$_2$—CH$_2$—O—, and
R$_h$=—(CH$_5$CH$_2$O)$_q$CH$_2$CH$_2$OH, wherein q=6;
the compounds of structure (IIB) having R$_f$ of structure (a) with
T=—C$_3$F$_6$Cl,
m and n such to give a molecular weight in the range of
450 to 650,
L=—CONH—, and
R$_h$=—(CH$_2$CH$_2$O)$_q$CH$_2$CH$_2$OCH$_3$, wherein q=21.

15. A formulation according to claim 1, wherein the PTFE is modified with one or more comonomers containing at least one unsaturation of ethylene type in an amount up to 6% molar.

16. A formulation according to claim 15, wherein the one or more comonomers containing at least one unsaturation of ethylene type is in an amount up to 1% molar.

17. A formulation according to claim 15, wherein the comonomers are of both hydrogenated and fluorinated type.

18. A formulation according to claim 17, wherein the hydrogenated comonomers are selected from the group consisting of ethylene, propylene, acrylic monomers, and styrene monomers.

19. A formulation according to claim 17, wherein the fluorinated comonomers are selected from:
C$_3$ to C$_6$ perfluoroolefins;
C$_2$ to C$_8$ hydrogenated fluoroolefins,
vinyl fluoride (VF),
vinylidene fluoride (VDF),
trifluoroethylene,
hexafluoroisobutene,
perfluoroakylethylene CH$_2$=CH—R$_f$, wherein R$_f$ is a C$_1$ to C$_6$ perfluoroalkyl;
C$_2$ to C$_8$ chlorofluoroolefins
C$_2$ to C$_8$ bromofluoroolefins,
C$_2$ to C$_8$ iodofluoroolefins;
CF$_2$=CFOR$_f$ (per)fluoroalkylvinylethers (PAVE), wherein R$_f$ is a C$_1$ to C$_6$ (per) fluoroalkyl;
CF$_2$=CFOX (per)fluoro-oxyalkylvinylethers, wherein X is selected from a C$_1$ to C$_{12}$ alkyl, a C$_1$ to C$_{12}$ oxyalkyl, or a C$_1$ to C$_{12}$ (per)fluoro-oxyalkyl having one or more ether, fluorodioxoles, or perfluorodioxoles groups.

20. A formulation according to claim 10, wherein the fluorinated comonomers are perfluoromethoxydioxole (MDO), perfluoropropylvinylether (PPVE), perfluoromethylvinylether (PMVE) and perfluoropropene (PFP).

* * * * *